United States Patent
Li (10) Patent No.: US 11,435,607 B2
(45) Date of Patent: Sep. 6, 2022

(54) LIQUID CRYSTAL COMPOSITE MATERIAL, LIGHT SWITCHING DEVICE, DISPLAY DEVICE AND MANUFACTURING METHODS THEREOF

(71) Applicants: Beijing BOE Technology Development Co., Ltd., Beijing (CN); BOE TECHNOLOGY GROUP CO., LTD., Beijing (CN)

(72) Inventor: Wenbo Li, Beijing (CN)

(73) Assignees: Beijing BOE Technology Development Co., Ltd., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/263,782

(22) PCT Filed: Jul. 6, 2020

(86) PCT No.: PCT/CN2020/100409
§ 371 (c)(1),
(2) Date: Jan. 27, 2021

(87) PCT Pub. No.: WO2021/017761
PCT Pub. Date: Feb. 4, 2021

(65) Prior Publication Data
US 2021/0215957 A1 Jul. 15, 2021

(30) Foreign Application Priority Data
Aug. 1, 2019 (CN) .......................... 201910707558.6

(51) Int. Cl.
*G02F 1/13* (2006.01)
*G02F 1/1333* (2006.01)
(Continued)

(52) U.S. Cl.
CPC ............ *G02F 1/1323* (2013.01); *C09K 19/46* (2013.01); *C09K 19/601* (2013.01); *G02F 1/137* (2013.01);
(Continued)

(58) Field of Classification Search
CPC ............... G02F 1/13756; G02F 1/1334; G02F 2202/04; G02F 1/13342; C09K 19/542; C09K 19/544
See application file for complete search history.

(56) References Cited
U.S. PATENT DOCUMENTS

| | | | | |
|---|---|---|---|---|
| 2012/0169971 A1* | 7/2012 | Hwang | ............. | G02F 1/133553 349/86 |
| 2014/0218663 A1* | 8/2014 | Stahl | ..................... | B42D 25/00 359/290 |

(Continued)

*Primary Examiner* — Michael H Caley
*Assistant Examiner* — Jonathan Y Jung
(74) *Attorney, Agent, or Firm* — Myers Bigel, P.A.

(57) ABSTRACT

A liquid crystal composite material is disclosed, including a polymer matrix, and a light-blocking body dispersed in the polymer matrix, wherein when no voltage is applied, the light-blocking body is randomly oriented so that the liquid crystal composite material is in a black state, and wherein when a voltage is applied, the light-blocking body is orderly oriented and the polymer matrix scatters incident light, so that the liquid crystal composite material is in a scattering state. A light switching device, a display device and methods for manufacturing the liquid crystal composite material, the light switching device, and the display device are further disclosed.

16 Claims, 5 Drawing Sheets

(51) Int. Cl.
    *G02F 1/1334* (2006.01)
    *G02F 1/137* (2006.01)
    *C09K 19/46* (2006.01)
    *C09K 19/60* (2006.01)

(52) U.S. Cl.
    CPC ...... *G02F 1/1334* (2013.01); *G02F 1/133354* (2021.01); *G02F 1/133377* (2013.01); *G02F 2202/04* (2013.01)

(56) References Cited

U.S. PATENT DOCUMENTS

2018/0134065 A1* 5/2018 Tompkin .............. B42D 25/328
2018/0307070 A1* 10/2018 Fujisawa ................ C09K 19/54

\* cited by examiner

LIQUID CRYSTAL COMPOSITE MATERIAL, LIGHT SWITCHING DEVICE, DISPLAY DEVICE AND MANUFACTURING METHODS THEREOF

CROSS-REFERENCE TO RELATED APPLICATIONS

The present application is a 35 U.S.C. 371 national stage application of PCT International Application No. PCT/CN2020/100409, filed on Jul. 6, 2020, which claims the benefit of Chinese Patent Application No. 201910707558.6, filed on Aug. 1, 2019, the entire disclosures of which are incorporated herein by reference.

TECHNICAL FIELD

The present disclosure relates to the field of displays, and more specifically to a liquid crystal composite material, a light switching device, a display device and their manufacturing methods.

BACKGROUND

A liquid crystal is an organic compound between solid and liquid, which has electro-optical properties. In recent years, liquid crystals have been widely used in fields such as display technology, smart windows, and anti-peeping field.

SUMMARY

According to an aspect, the embodiments of the present disclosure provide a liquid crystal composite material, comprising: a polymer matrix; and
a light-blocking body dispersed in the polymer matrix,
wherein when no voltage is applied, the light-blocking body is randomly oriented so that the liquid crystal composite material is in a black state, and
wherein when a voltage is applied, the light-blocking body is orderly oriented and the polymer matrix scatters incident light, so that the liquid crystal composite material is in a scattering state.

In some embodiments, the polymer matrix comprises a copolymer of both an optically anisotropic macromolecular liquid crystal and an optically isotropic polymer.

In some embodiments, the light-blocking body comprises a small-molecule liquid crystal.

In some embodiments, the light-blocking body further comprises a dichroic dye.

In some embodiments, a refractive index of the optically anisotropic macromolecular liquid crystal in a light incident direction is different from a refractive index of the optically isotropic polymer in the light incident direction.

In some embodiments, a mass percentage of the dichroic dye in the liquid crystal composite material is 1%-15%.

In some embodiments, the optically anisotropic macromolecular liquid crystal is formed by polymerization of small-molecule liquid crystals comprising polymerizable groups.

According to another aspect, the embodiments of the present disclosure further provide a light switching device, comprising:
a first substrate
a second substrate; and
the liquid crystal composite material mentioned above, which is between the first substrate and the second substrate.

In some embodiments, the light switching device further comprises retaining walls between the first substrate and the second substrate, wherein the retaining walls define first hollow areas that are distributed periodically, and the liquid crystal composite material is in the first hollow areas.

In some embodiments, the retaining walls are optically transparent.

In some embodiments, the retaining walls further comprise second hollow areas extending from the first substrate to the second substrate.

According to a further aspect, the embodiments of the present disclosure further provide a display device, comprising:
a backlight;
a display panel; and
the light switching device mentioned above, which is between the backlight and the display panel.

According to a further aspect, the embodiments of the present disclosure further provide a method for preparing a liquid crystal composite material, comprising:
preparing a mixture comprising a small-molecule liquid crystal, a dichroic dye, monomers of an optically anisotropic macromolecular liquid crystal, and monomers of an optically isotropic polymer; and
photopolymerizing the monomers of the optically anisotropic macromolecular liquid crystal and the monomers of the optically isotropic polymer.

According to a further aspect, the embodiments of the present disclosure further provide a method for manufacturing a light switching device, comprising:
preparing a first substrate;
arranging the liquid crystal composite material mentioned above on the first substrate; and
preparing a second substrate, and assembling the second substrate with the first substrate.

In some embodiments, arranging the liquid crystal composite material on the first substrate comprises:
manufacturing retaining walls on the first substrate by using a patterning process, the retaining walls defining first hollow areas distributed periodically;
preparing a mixture in the first hollow areas, the mixture comprising a small-molecule liquid crystal, a dichroic dye, monomers of an optically anisotropic macromolecular liquid crystal, and monomers of an optically isotropic polymer; and
photopolymerizing the monomers of the optically anisotropic macromolecular liquid crystal and monomers of the optically isotropic polymer to form the liquid crystal composite material.

In some embodiments, the retaining walls further define second hollow areas extending from the first substrate to the second substrate.

According to a further aspect, the embodiments of the present disclosure further provide a method for manufacturing a display device, comprising:
manufacturing a backlight;
manufacturing a display panel; and
manufacturing the light switching device according to the method mentioned above between the backlight and the display panel.

BRIEF DESCRIPTION OF THE DRAWINGS

In order to more clearly describe the technical solutions in the embodiments of the present disclosure, the accompanying drawings need to be used in the description of the embodiments will be briefly introduced in the following.

Obviously, the accompanying drawings in the following description are only some embodiments of the present disclosure. The drawings are only schematic and not necessarily to scale. In the drawings:

FIG. 4A and FIG. 413 are respectively schematic cross-sectional views of a display device according to an embodiment of the present disclosure in different states;

DETAILED DESCRIPTION OF EMBODIMENTS

In order to make the objectives, technical solutions, and advantages of the embodiments of the present disclosure clearer, the technical solutions of the embodiments of the present disclosure will be described in further detail below in conjunction with the accompanying drawings.

A Polymer Dispersed Liquid Crystal (PDLC) is an interesting material system in recent years. Generally, a PDLC includes a homogeneous polymer matrix phase and a liquid crystal phase dispersed therein. The function mechanism of a conventional PDLC is that when there is no electric field, the liquid crystal molecules in the liquid crystal phase are arranged unorderly, so that a difference between a refractive index of the polymer matrix phase and a refractive index of the liquid crystal molecule in a direction of incident light (also referred as ordinary refractive index) is large. In this case, the incident light is scattered, and the PDLC exhibits a scattering state. When under the action of an electric field, the liquid crystal molecules in the liquid crystal phase are arranged orderly so that the refractive index of the polymer matrix phase and the refractive index of the liquid crystal molecules in the direction perpendicular to the direction of the incident light are equal or have a small difference. In this case, the incident light is transmitted, and the PDLC exhibits a transparent state. In this way, the scattering state and the transmission state can be effectively switched.

In some application scenarios, such as anti-peeping application, it is often required to switch between a wide viewing angle display state and a narrow viewing angle display state.

Figure 1A:
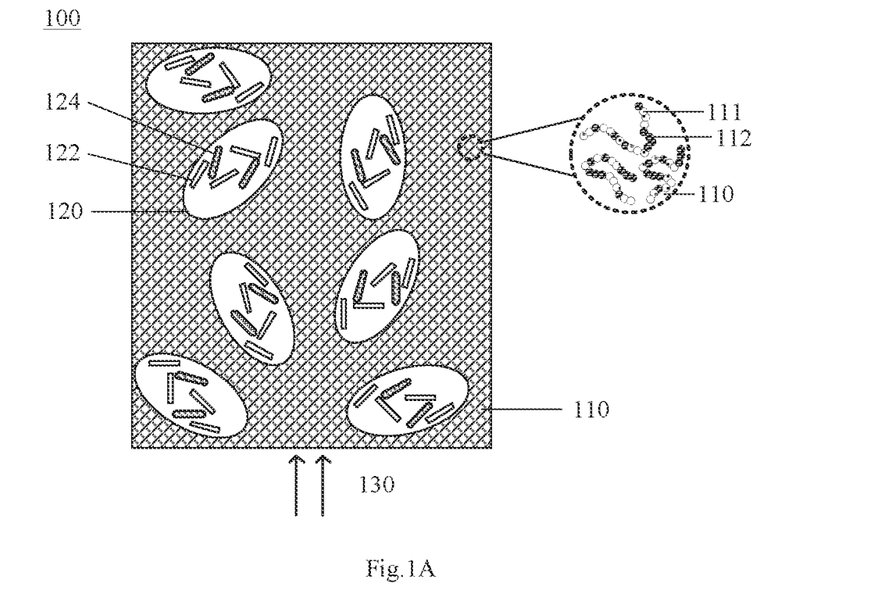
FIG. 1A is a schematic diagram of a liquid crystal composite material according to an embodiment of the present disclosure when no electric field is applied.

FIG. 1A shows a schematic diagram of a liquid crystal composite material according to an embodiment of the present disclosure. In an exemplary embodiment, the liquid crystal composite material 100 includes a polymer matrix 110. As shown in the enlarged view in the upper right corner of FIG. 1A, the polymer matrix 110 includes, for example, a copolymer of both an optically anisotropic macromolecular liquid crystal 111 and an optically isotropic polymer 112. It should be understood that the types of copolymers of the polymer matrix 110 include, for example, random copolymers, alternating copolymers, block copolymers, graft copolymers and other polymer types, etc. The present disclosure does not limit this, as long as the structure of the polymer matrix 110 can realize the functions described in the present disclosure. In some embodiments, the polymer matrix 110 is a single phase. In some embodiments, since the molecular chain of the optically anisotropic macromolecular liquid crystal is relatively long, it maintains an anisotropic structure in the liquid crystal composite material 100 without arbitrarily changing the orientation in response to an electric field. In some embodiments, a refractive index $n_1$ of the optically anisotropic macromolecular liquid crystal in a direction of the incident light 130 is different from a refractive index $n_p$ of the optically isotropic polymer, so that the polymer matrix 110 scatters the incident light 130. For example, the refractive index $n_1$ of the optically anisotropic macromolecular liquid crystal in the direction of the incident light 130 differs from the refractive index $n_p$ of the optically isotropic polymer by no less than 1%, such as 2-5%.

The optically anisotropic macromolecular liquid crystal is formed by polymerization of small-molecule liquid crystals comprising polymerizable groups. For example, the monomers of the optically anisotropic macromolecular liquid crystal are polymerizable liquid crystal molecules, that is, the liquid crystal molecules are modified by grafting or the like so that the liquid crystal molecules include polymerizable groups, which can be polymerized into anisotropic macromolecular liquid crystals. In some embodiments, the optically anisotropic macromolecular liquid crystal includes a combination of multiple liquid crystal materials. As known to those skilled in the art, examples of such polymerizable liquid crystal molecules include but are not limited to one or more of the following:

The monomer of the optically isotropic polymer is, for example, one or more compounds selected from the thermosetting epoxy resin, acrylate, and methacrylate, such as alkoxy nonphenyl acrylate, trimethylolpropane triacrylate, lauryl acrylate (LA), polyethylene glycol diacrylate (PEG400), 1,6-hexanediol diacrylate, etc. In the context of the present disclosure, any optically isotropic polymer that can form a single phase with the optically anisotropic macromolecular liquid crystal can be used, which is not limited.

In some embodiments, the liquid crystal composite material further includes a light-blocking body 120. Both the polymer matrix 110 and the light-blocking body 120 form a PDLC structure. In some embodiments, the light-blocking body 120 is dispersed in the polymer matrix 110. For example, the light-blocking body 120 is, for example, a single phase dispersed in pores of the polymer matrix 110. The light-blocking body 120 is randomly distributed in the polymer matrix 110, for example.

In some embodiments, the light-blocking body 120 is, for example, a single phase including the small-molecule liquid crystal 122. The small-molecule liquid crystal 122 is, for example, a combination of multiple small-molecule liquid crystals. For example, the small-molecule liquid crystal 122 is, for example, a small-molecule liquid crystal E-7 (available from Merk Company, Germany). In some embodiments, the small-molecule liquid crystal is a nematic liquid crystal. However, other suitable types of liquid crystals and combinations thereof that can realize the functions described in the embodiments of the present disclosure, for example, smectic liquid crystals and cholesteric liquid crystals, etc. may also be used. This disclosure does not limit this.

Figure 1B:
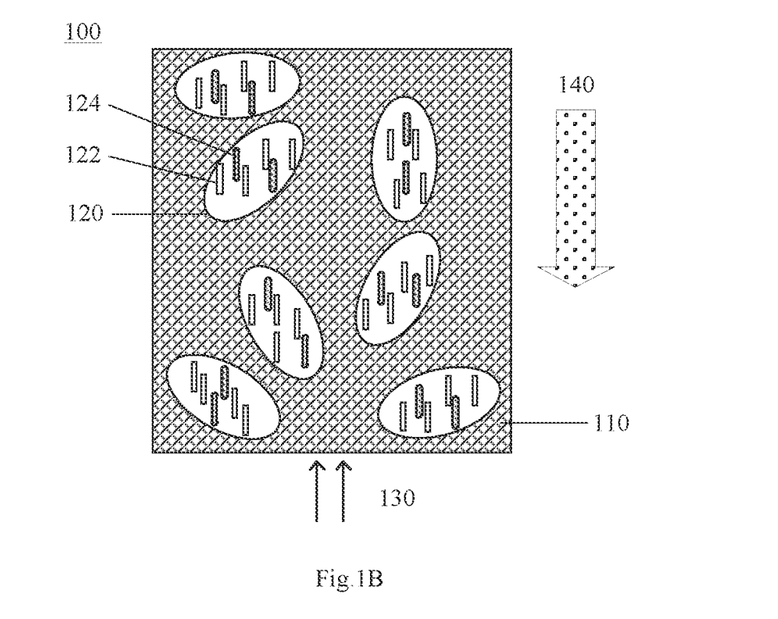
FIG. 1B is a schematic diagram of the liquid crystal composite material shown in FIG. 1A when an electric field is applied.

The small-molecule liquid crystal 122 can change its orientation under the action of an electric field, thereby changing the refractive index $n_2$ of the light-blocking body 120 in the direction of the incident light 130. As shown in FIG. 1A, when no electric field is applied, the light-blocking body 120 is randomly oriented, and its refractive index $n_2$ is greatly different from the refractive index $n_3$ of the polymer matrix, so that the incident light 130 is largely absorbed, and the liquid crystal composite material 100 is in a black state. As shown in FIG. 1B, when an electric field 140 is applied, the light-blocking body 120 is orderly oriented in response to the electric field. For example, the long axises of the liquid crystal molecules are oriented parallel to the direction of the incident light, so that the refractive index $n_2$ of the light-blocking body 120 is equal to or slightly different from the refractive index $n_3$ of the polymer matrix, and at this time since the refractive index $n_1$ of the optically anisotropic macromolecular liquid crystal in the direction of the incident light 130 is different from the refractive index $n_p$ of the optically isotropic polymer, the polymer matrix 110 scatters the incident light 130, so that the liquid crystal composite material 100 is in a scattering state.

In order to further improve the effect of the black state in FIG. 1A, as shown in FIG. 1A, in some embodiments, the light-blocking body 120 further includes, for example, one or more dichroic dyes 124. The term "dichroic dye" as used in the present disclosure refers to a dye having an anisotropic absorbance. For example, the long axis and the short axis of a dichroic dye have different light absorptions. In some embodiments, the dichroic dye 124 is dissolved in the small-molecule liquid crystal 122 and forms a single phase. Due to the existence of the "guest-host effect", the dichroic dye 124 also exists anisotropically depending on the molecules of the small-molecule liquid crystal 122, and can also change its orientation along with the small-molecule liquid crystal 122 under the action of an electric field.

As shown in FIG. 1A, when no electric field is applied, the light-blocking body 120 is randomly oriented, and the dichroic dye 124 therein is also randomly oriented, so that the dichroic dye 124 absorbs more of the incident light 130, and the light-blocking body 120 absorbs more of the incident light 130 than the polymer matrix 110, the liquid crystal composite material 100 is in a black state. As shown in FIG. 1B, when the electric field 140 is applied, the light-blocking body 120 is orderly oriented. For example, the long axises of the liquid crystal molecules are oriented parallel to the direction of the incident light. Due to the existence of the guest-host effect, the dichroic dye 124 in the light-blocking body 120 also changes to an orientation with less absorption along with the small-molecule liquid crystal 122. In this case, the light-blocking body 120 absorbs little incident light 130, and at this time since the refractive index $n_l$ of the optically anisotropic macromolecular liquid crystal in the direction of the incident light 130 is different from the refractive index $n_p$ of the optically isotropic polymer, the polymer matrix 110 scatters the incident light 130, so that the liquid crystal composite material 100 is in a scattering state.

In some embodiments, the absorption A// of the dichroic dye 124 for polarized light parallel to the long axis direction of the molecule of the small-molecule liquid crystal 122 is less than the absorption A⊥ for polarized light perpendicular to the long axis direction of the molecule of the small-molecule liquid crystal 122. Correspondingly, the transmission T// of the dichroic dye 124 for polarized light parallel to the long axis direction of the molecule of the small-molecule liquid crystal 122 is greater than the transmission T⊥ for polarized light perpendicular to the long axis direction of the molecule of the small-molecule liquid crystal 122. In some embodiments, the dichroic dye 124 is, for example, one or more selected from azo-dichroic dye and anthraquinone dye. E.g:

i.e., 2,3-diaminoanthraquione, and

In some embodiments, the dichroic dye 124 is, for example, a black dichroic dye, that is, the dichroic dye 124 has good absorption for different spectra in the visible spectrum. In some embodiments, the mass percentage of the dichroic dye 124 in the entire liquid crystal composite material 100 is 1%-15%, for example, 5-10%. In some embodiments, the mass percentage of the dichroic dye 124 in the entire liquid crystal composite material 100 is 8%.

Figure 2A:
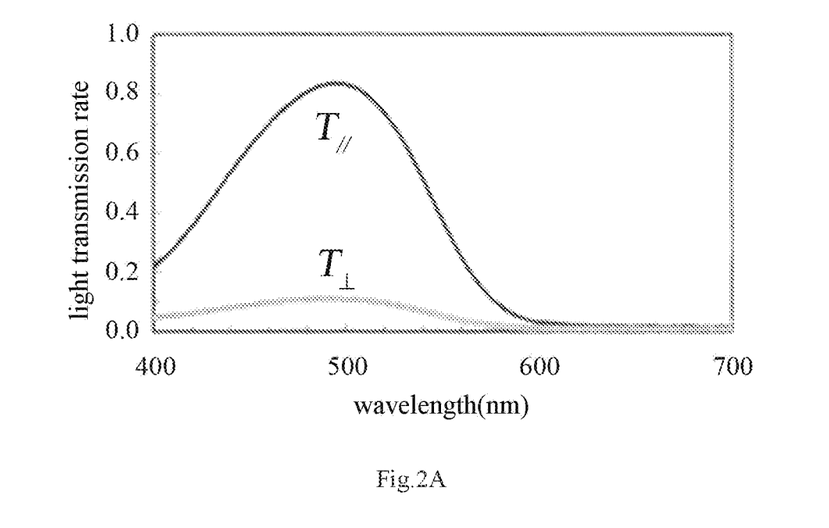
FIG. 2A is a spectral distribution diagram of a dichroic dye molecule according to an embodiment of the present disclosure, showing both the transmission for polarized light parallel to the long axis direction of the dichroic dye molecule and the transmission for polarized light perpendicular to the long axis direction of the dichroic dye molecule.

FIG. 2A shows a spectral distribution diagram of both the transmission T// of the molecule of for the polarized light parallel to the long axis direction of the molecule of and the transmission T⊥ of the molecule of for the polarized light perpendicular to the long axis direction of the molecule of

Figure 2B:
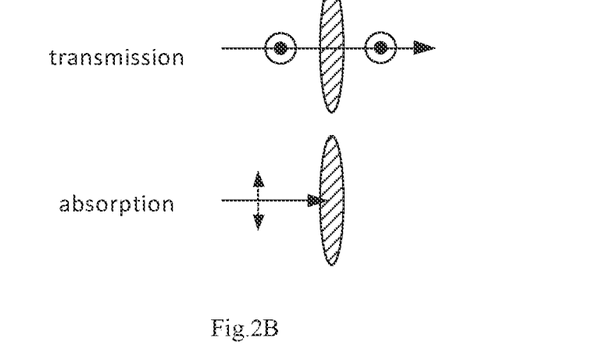
FIG. 2B is a schematic diagram of different absorption states of a dichroic dye molecule according to an embodiment of the present disclosure for the polarized light parallel to the long axis direction of the dichroic dye molecule and for the polarized light perpendicular to the long axis direction of the dichroic dye molecule.

FIG. 2B shows a schematic diagram of the different absorption states of a molecule of for the polarized light parallel to the long axis direction of the molecule of and for the polarized light perpendicular to the long axis direction of the molecule of

In FIG. 2A, the transmission T// of the molecule of for the polarized light parallel to the long axis direction of the molecule of is significantly greater than the transmission T⊥ of the molecule of for the polarized light perpendicular to the long axis direction of the molecule of

In FIG. 2B, the molecule of rarely absorbs the polarized light parallel to the long axis direction of the molecule of and basically transmits the polarized light in that direction; and the molecule of basically absorbs the polarized light perpendicular to the long axis direction of the molecule of and rarely transmits the polarized light in that direction.

It should be understood that various variations and modifications can be made within the scope not deviating from the spirit of the present disclosure, and the variations and modifications are also within the protection scope of the present disclosure. For example, the small-molecule liquid crystal 122 includes a dual-frequency liquid crystal, which can cooperate with a dual-frequency electric field to achieve state switching. In the liquid crystal composite material provided by the embodiments of the present disclosure, through the action of both the polymer matrix 110 and the light-blocking body 120, it is possible to switch between the black state and the scattering state of incident light.

Figure 3A:
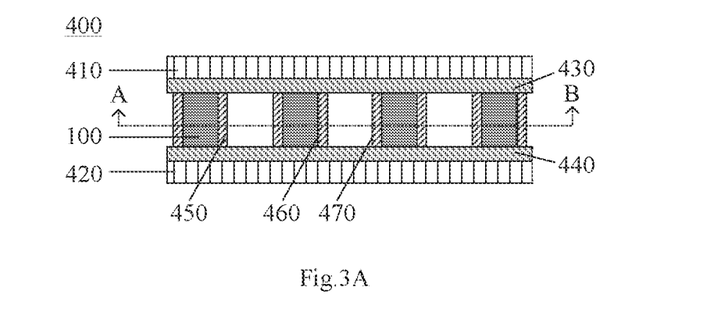
FIG. 3A is a schematic cross-sectional view of a light switching device according to an embodiment of the present disclosure.

FIG. 3A shows a schematic cross-sectional view of a light switching device 400 according to an embodiment of the present disclosure. As shown in the figure, the light switching device 400 includes a first substrate 410, a second substrate 420, and the above-mentioned liquid crystal composite material 100 between the two. In some embodiments, the first substrate 410 and the second substrate 420 are, for example, optically transparent. In some embodiments, the first substrate 410 and the second substrate 420 are, for example, flexible, such as a resin material. In this case, the light switching device 400 is also flexible. By applying an electric field to the liquid crystal composite material 100 through the first substrate 410 and the second substrate 420, the light transmission state of the light switching device 400 can be adjusted. When no electric field is applied, the liquid crystal composite material 100 is in a black state. When an electric field is applied, the liquid crystal composite material 100 is in a scattering state, that is, the liquid crystal composite material 100 is optically opaque, and the light emitted from the light switching device 400 at this time is scattered light.

In some embodiments, the light switching device 400 further includes a first electrode 430 on a side of the first substrate 410 facing the second substrate 420, and a second electrode 440 on a side of the second substrate 420 facing the first substrate 410. The first electrode 430 and the second electrode 440 may be electrically connected to a power source for providing an electric field.

In some embodiments, the light switching device 400 further includes retaining walls 450 between the first substrate 410 and the second substrate 420. The retaining walls 450 define first hollow areas 460 and second hollow areas 470 that are periodically distributed. The first hollow areas 460 are used to accommodate the liquid crystal composite material. By providing the first hollow areas 460 for accommodating the liquid crystal composite material and the second hollow areas 470 not accommodating the liquid crystal composite material, the liquid crystal composite material 100 can be selectively provided in different spatial regions.

Figure 3B:
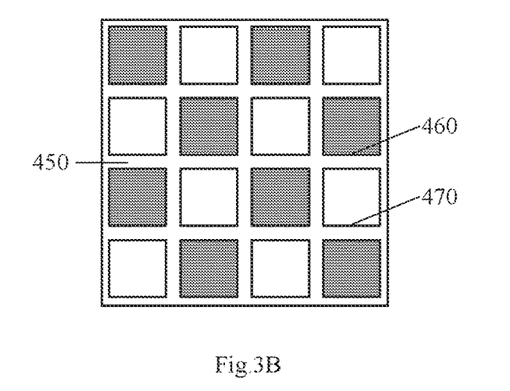
FIG. 3B and FIG. 3C are schematic cross-sectional views of the light switching device taken along line A-B in the FIG. 3A.
Figure 3C:
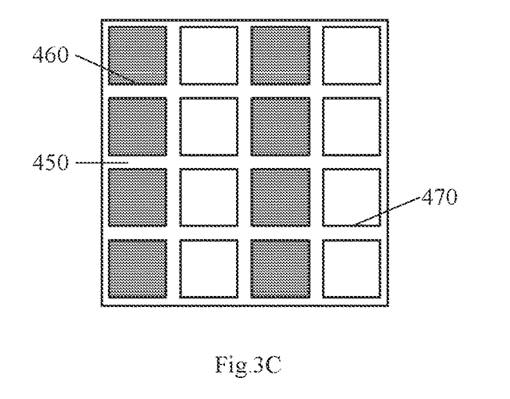

FIG. 3B and FIG. 3C show schematic top views of the spatial array patterns of the first hollow areas 460 and the second hollow areas 470 according to an embodiment of the present disclosure, which are taken along the line A-B in FIG. 3A. In FIG. 3B, the first hollow areas 460 and the second hollow areas 470 are arranged at intervals in space. Each first hollow area 460 is surrounded by second hollow areas 470, and each second hollow area 470 is surrounded by first hollow areas 460. In FIG. 3C, the first hollow areas 460 and the second hollow areas 470 are in an interlacing arrangement in space. Each row of first hollow areas 460 and each row of second hollow areas 470 are alternately arranged.

FIG. 3B and FIG. 3C are top views along the normal direction of the first substrate 410 or the second substrate 420. In some embodiments, the projections of the first hollow areas 460 and the second hollow areas 470 on the first substrate 410 or the second substrate 420 have the same shape, for example, a square as shown. It should be noted that the projections can have other shapes, such as rectangle, circle, etc. It should also be noted that the projections of the first hollow areas 460 may have a different shape from the projections of the second hollow areas 470.

In some embodiments, the retaining walls 450 are formed of an optically transparent material. Examples of such optically transparent material include, but are not limited to, epoxy resin, polyimide, and silicone, etc. In some embodiments, the retaining walls 450 include, for example, a stack of multiple different materials. For example, the retaining walls 450 include, for example, a bonding layer and an insulating layer, etc.

In some embodiments, the second hollow areas 470 are filled with an optically transparent material, for example, a material having a refractive index matching the first substrate 410 and the second substrate 420 to facilitate light transmission.

It should be understood that the second hollow areas 470 are not necessary, that is, the retaining walls 450 do not limit the second hollow areas 470. In this case, the retaining walls 450 only define the first hollow areas 460.

Figure 4A:
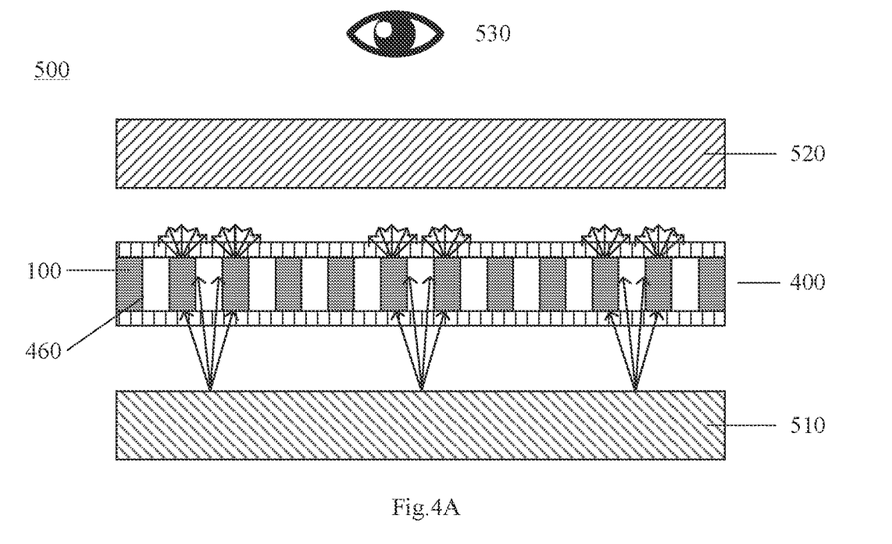

FIG. 4A schematically shows a cross-sectional view of a display device 500 according to an embodiment of the present disclosure. In FIG. 4A, the display device 500 includes the above-mentioned light switching device 400, a backlight 510, and a display panel 520. The light emitted by the backlight 510 passes through the light switching device 400 to reach the display panel 520 for display, and is finally perceived by the user's eyes 530 on the side of the display panel 520 away from the light switching device 400. In some embodiments, the retaining walls 450 are optically transparent, so the retaining walls 450 and the second hollow areas 470 are not distinguished in FIG. 4A (i.e., the areas between the first hollow areas 460 in the figure). In FIG. 4A, the liquid crystal composite material 100 in the light switching device 400 is in the scattering state. In this case, the light incident into the areas of retaining walls 450 is not scattered or only rarely scattered, while the light incident into the first hollow areas 460 (that is, the liquid crystal composite material 100 accommodated therein) is sufficiently scattered. Therefore, the eyes 530 can see images from various scattering directions, that is, the display panel 520 can perform wide viewing angle display.

Figure 4B:
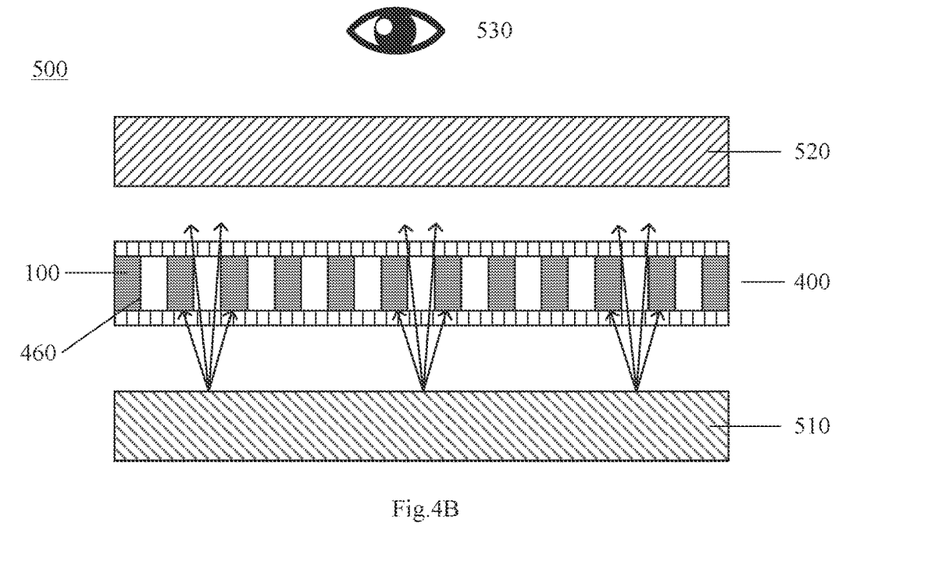

In FIG. 4B, the liquid crystal composite material 100 in the light switching device 400 is in the black state. In this case, the light incident into the areas of retaining walls 450 is not scattered or only rarely scattered, while the light incident into the first hollow areas 460 (that is, the liquid crystal composite material 100) is absorbed and not transmitted through the light switching device 400, so that the eyes 530 can only see the images from the direction corresponding to the areas of retaining walls 450, that is, the display panel 520 can perform narrow viewing angle display. By adjusting the configuration, size, and material of the retaining walls 450, the light path of the light in the retaining walls 450 can be changed, so that the viewing angle of the narrow viewing angle display can be further adjusted. For example, the size of the second hollow areas 470 may be zero, that is, there is no second hollow area 470. In this case, light only propagates through the retaining walls 450 themselves.

This type of display device 500 can be widely used in fields such as anti-peeping display, including but not limited to a display, a mobile phone, a tablet, a notebook computer, a navigator, a smart window, and the like.

Figure 6:
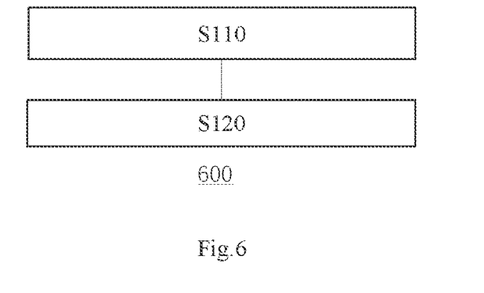
FIG. 6 schematically shows a flowchart of a method for preparing a liquid crystal composite material according to some embodiments of the present disclosure.

FIG. 6 schematically shows a flowchart of a method 600 for preparing a liquid crystal composite material according to some embodiments of the present disclosure. The liquid crystal composite material according to the embodiments of the present disclosure can be prepared according to the following steps:

S110: preparing a mixture comprising a small-molecule liquid crystal, a dichroic dye, monomers of an optically anisotropic macromolecular liquid crystal, and monomers of an optically isotropic polymer; and S120: photopolymerizing the monomers of the optically anisotropic macromolecular liquid crystal and the monomers of the optically isotropic polymer.

In step S110, the monomers of the optically anisotropic macromolecular liquid crystal and the monomers of the optically isotropic polymer are, for example, photopolymerizable monomers. The small-molecule liquid crystal and the dichroic dye cannot be photopolymerized. The mixture includes auxiliary agents such as photoinitiators. The mass fraction of the small-molecule liquid crystal in the liquid crystal composite material is 20%-90%, for example, 50%. In some embodiments, the small-molecule liquid crystal, the dichroic dye, the monomers of the optically anisotropic macromolecular liquid crystal, the monomers of the optically isotropic polymer, and various auxiliary agents are mixed into a uniform single phase. Other methods for preparing the mixture are known to those skilled in the art and will not be repeated here.

In step S120, the means of photopolymerization includes UV, visible light, IR, X-ray polymerization and the like. For example, under the UV irradiation of the mixture that is mixed into the uniform single phase in S110, the monomers of the optically anisotropic macromolecular liquid crystal and the monomers of the optically isotropic polymer are activated and cross-linked to gradually form a copolymer. At the same time, the small-molecular liquid crystal and the dichroic dye gradually undergo phase separation from the copolymer, and finally form a uniformly dispersed structure of light-blocking bodies. For example, the UV intensity is 0.001-100 mW/cm$^2$, and the irradiation time range is 5-240 minutes. The morphology and size of the light-blocking body can be adjusted by controlling the reactants and reaction conditions.

Figure 7:
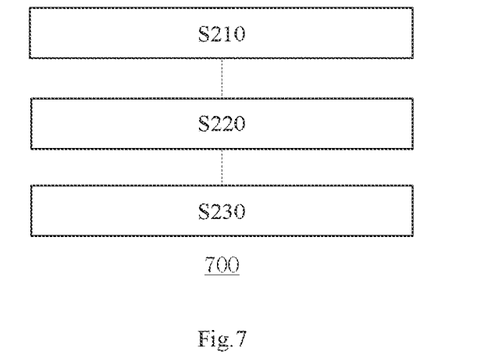
FIG. 7 schematically shows a flowchart of a method for manufacturing a light switching device according to some embodiments of the present disclosure.

Referring to FIG. 7, in some embodiments, a method 700 for manufacturing the above-mentioned light switching device includes the following steps:

S210: preparing a first substrate;

S220: preparing the liquid crystal composite material on the first substrate; and S230: preparing a second substrate, and assembling the second substrate with the first substrate.

Figure 8:
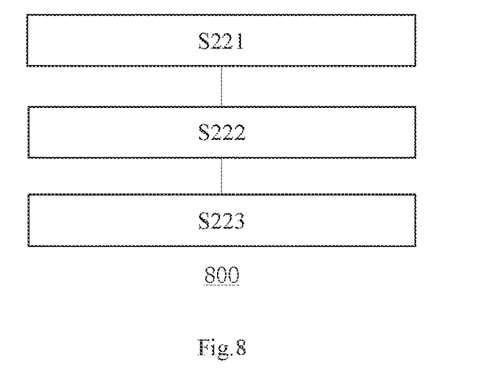
FIG. 8 schematically shows a flowchart of a method for arranging a liquid crystal composite material on a first substrate according to some embodiments of the present disclosure.

FIG. 8 schematically shows a flowchart of a method 800 for arranging a liquid crystal composite material on a first substrate according to some embodiments of the present disclosure. In some embodiments, step S220 specifically includes the following steps:

S221: manufacturing retaining walls on the first substrate by using a patterning process, the retaining walls defining first hollow areas distributed periodically;

S222: preparing a mixture in the first hollow areas, the mixture comprising a small-molecule liquid crystal, a dichroic dye, monomers of an optically anisotropic macromolecular liquid crystal, and monomers of an optically isotropic polymer; and S223: photopolymerizing the monomers of the optically anisotropic macromolecular liquid crystal and monomers of the optically isotropic polymer.

For example, in step S221, when manufacturing retaining walls on the first substrate by using a patterning process, the retaining walls further define periodically distributed second hollow areas extending from the first substrate to the second substrate.

Figure 5A:
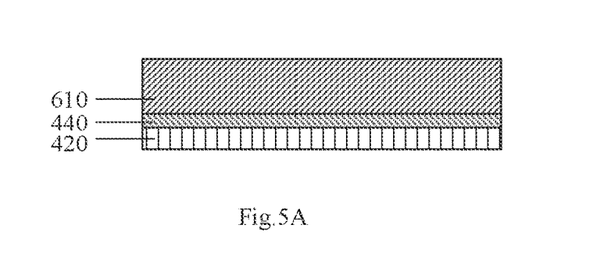
FIG. 5A, FIG. 5B, and FIG. 5C are schematic diagrams of different steps of a method for manufacturing a light switching device according to an embodiment of the present disclosure.
Figure 5B:
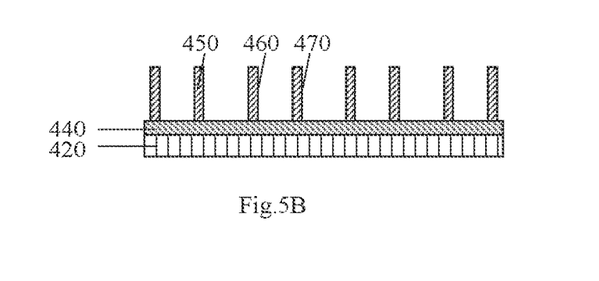
Figure 5C:
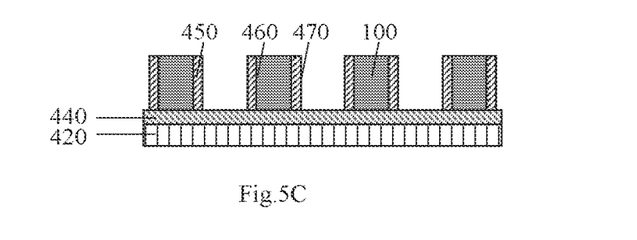

The steps S221-S223 are described below by way of example with reference to FIGS. 5A, 5B, and 5C. Firstly, as shown in FIG. 5A, a transparent second electrode 440 is sputtered on the second substrate 420. A retaining wall layer 610 is fabricated by sputtering, coating and other processes. The material of the retaining wall layer 610 is, for example, epoxy resin, polyimide, and silicone, etc. The retaining wall layer 610 includes, for example, a stack of multiple different materials. For example, the retaining wall layer 610 includes a bonding layer and an insulating layer, etc. Sputtering, coating and other processes are known to those skilled in the art, and will not be repeated here. Then, as shown in FIG. 5B, the retaining wall layer 610 is patterned through a patterning process to form retaining walls 450 that define the first hollow areas 460 and the second hollow areas 470. The first hollow areas 460 and the second hollow areas 470 are, for example, arranged in the way as described above, and the second hollow areas 470 are not necessary. As known to those skilled in the art, the patterning process can be conventional photoresist coating, exposure, development, etching, stripping, etc. Afterwards, as shown in FIG. 5C, the mixture is prepared in the first hollow areas 460 or added into the first hollow areas 460. The mixture includes the small-molecule liquid crystal, the dichroic dye, the monomers of the optically anisotropic macromolecular liquid crystal and the monomers of the optically isotropic polymer. The process of adding the mixture includes, for example, inkjet printing, and the like. Then, the first electrode 430 and the first substrate 410 are assembled and packaged with the structure shown in FIG. 5C, and UV irradiation is applied to the packaged structure to perform UV polymerization to the monomers of the optically anisotropic macromolecular liquid crystal and the monomers of the optically isotropic polymer, to form the light switching device as shown in FIG. 3A, completing the manufacturing of the light switching device.

Figure 9:
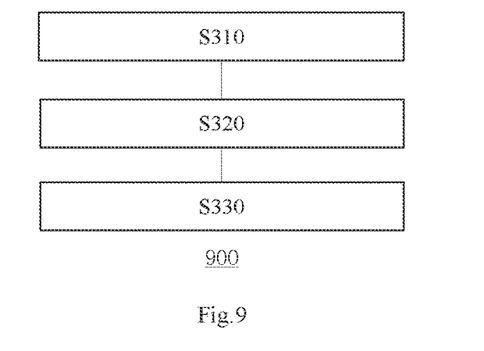
FIG. 9 schematically shows a flowchart of a method for manufacturing a display device according to some embodiments of the present disclosure.

Referring to FIG. 9, an embodiment of the present disclosure also provides a method 900 for manufacturing a display device, including: S310: manufacturing a backlight; S320: manufacturing a display panel; and S330: manufacturing the light switching device according to the method as mentioned above between the backlight and the display panel. The manufacturing method of the display device can refer to the embodiments of the manufacturing method of the light switching device, and will not be repeated.

It should be understood that in the description of the present disclosure, the "black state" does not only mean a state in which light cannot be transmitted at all or can hardly be transmitted. In some embodiments, compared with the "scattering state", the "black state" refers to a state in which less light can be transmitted than the "scattering state".

The embodiments of the present disclosure provide a liquid crystal composite material, a light switching device, a display device, and manufacturing methods thereof. By forming a composite material including a polymer matrix and a light-blocking body, it is possible to switch between the black state and the scattering state of the liquid crystal composite material when an electric field is applied. The light switching device made of this liquid crystal composite material can respectively absorb and scatter incident light when an electric field is applied. Combined with the patterning process, this light switching device can realize a display device that can switch between a narrow viewing angle and a wide viewing angle, thereby realizing the anti-peep function.

As will be apparent to those skilled in the art, many different ways of performing the methods of these embodiments of the present disclosure are possible. For example, the order of the steps can be changed, or some steps can be executed in parallel. In addition, other method steps can be inserted between the steps. The inserted steps may represent an improvement of the method such as described herein, or may be unrelated to the method. In addition, a given step may not be fully completed before the next step starts.

Obviously, those skilled in the art can make various variations and modifications to the present disclosure without departing from the spirit and scope of the present disclosure. In this way, if these modifications and variations of the present disclosure fall within the scope of the claims of the present disclosure and their equivalent technologies, the present disclosure is also intended to include these modifications and variations.

What is claimed is:

1. A liquid crystal composite material, comprising:
a polymer matrix comprising a copolymer of both an optically anisotropic macromolecular liquid crystal and an optically isotropic polymer; and
a light-blocking body dispersed in the polymer matrix,
wherein when no voltage is applied, the light-blocking body is randomly oriented so that the liquid crystal composite material is in a black state, and
wherein when a voltage is applied, the light-blocking body is orderly oriented and the polymer matrix scatters incident light, so that the liquid crystal composite material is in a scattering state.

2. The liquid crystal composite material according to claim 1, wherein the light-blocking body comprises a small-molecule liquid crystal.

3. The liquid crystal composite material according to claim 2, wherein the light-blocking body further comprises a dichroic dye.

4. The liquid crystal composite material according to claim 1, wherein a refractive index of the optically anisotropic macromolecular liquid crystal in a light incident direction is different from a refractive index of the optically isotropic polymer in the light incident direction.

5. The liquid crystal composite material according to claim 3, wherein a mass percentage of the dichroic dye in the liquid crystal composite material is 1%-15%.

6. The liquid crystal composite material according to claim 1, wherein the optically anisotropic macromolecular liquid crystal is formed by polymerization of small-molecule liquid crystals comprising polymerizable groups.

7. A light switching device, comprising:
a first substrate;
a second substrate; and
the liquid crystal composite material according to claim 1, which is between the first substrate and the second substrate.

8. The light switching device according to claim 7, further comprising:
retaining walls between the first substrate and the second substrate,
wherein the retaining walls define first hollow areas that are distributed periodically, and
wherein the liquid crystal composite material is in the first hollow areas.

9. The light switching device according to claim 8, wherein the retaining walls are optically transparent.

10. The light switching device according to claim 8, wherein the retaining walls further comprise second hollow areas extending from the first substrate to the second substrate.

11. A display device, comprising:
a backlight;
a display panel; and
the light switching device according to claim 7, which is between the backlight and the display panel.

12. A method for preparing a liquid crystal composite material, comprising:
preparing a mixture comprising a small-molecule liquid crystal, a dichroic dye, monomers of an optically anisotropic macromolecular liquid crystal, and monomers of an optically isotropic polymer; and
photopolymerizing the monomers of the optically anisotropic macromolecular liquid crystal and the monomers of the optically isotropic polymer.

13. A method for manufacturing a light switching device, comprising:
preparing a first substrate;
arranging the liquid crystal composite material according to claim 1 on the first substrate; and
preparing a second substrate, and assembling the second substrate with the first substrate.

14. A method for manufacturing a light switching device, comprising:
preparing a first substrate;
arranging a liquid crystal composite material on the first substrate; and
preparing a second substrate, and assembling the second substrate with the first substrate;
wherein the liquid crystal composite material comprises:
a polymer matrix; and
a light-blocking body dispersed in the polymer matrix,
wherein when no voltage is applied, the light-blocking body is randomly oriented so that the liquid crystal composite material is in a black state, and
wherein when a voltage is applied, the light-blocking body is orderly oriented and the polymer matrix scatters incident light, so that the liquid crystal composite material is in a scattering state, and
wherein arranging the liquid crystal composite material on the first substrate comprises:
manufacturing retaining walls on the first substrate by using a patterning process, the retaining walls defining first hollow areas distributed periodically;
preparing a mixture in the first hollow areas, the mixture comprising a small-molecule liquid crystal, a dichroic dye, monomers of an optically anisotropic macromolecular liquid crystal, and monomers of an optically isotropic polymer; and
photopolymerizing the monomers of the optically anisotropic macromolecular liquid crystal and monomers of the optically isotropic polymer to form the liquid crystal composite material.

15. The method according to claim 14, wherein the retaining walls further define second hollow areas extending from the first substrate to the second substrate.

16. A method for manufacturing a display device, comprising:
manufacturing a backlight;
manufacturing a display panel; and
manufacturing the light switching device according to the method of claim 7, between the backlight and the display panel.

* * * * *